United States Patent [19]
Takao et al.

[11] Patent Number: 5,734,456
[45] Date of Patent: Mar. 31, 1998

[54] FERROELECTRIC LIQUID CRYSTAL DEVICE AND DISPLAY HAVING MAXIMUM PEAK OF SURFACE ROUGHNESS OF COLOR FILTER OF 0.1 MICRON OR LESS

[75] Inventors: Hideaki Takao, Sagamihara; Masanobu Asaoka, Yokohama; Makoto Kojima, Atsugi, all of Japan

[73] Assignee: Canon Kabushiki Kaisha, Tokyo, Japan

[21] Appl. No.: 218,034

[22] Filed: Mar. 25, 1994

Related U.S. Application Data

[63] Continuation of Ser. No. 791,235, Nov. 13, 1991, abandoned.

[30] Foreign Application Priority Data

Nov. 16, 1990 [JP] Japan ................... 2-308722
Nov. 1, 1991 [JP] Japan ................... 3-313115

[51] Int. Cl.$^6$ .................... G02F 1/1333; G02F 1/141
[52] U.S. Cl. .................... 349/106; 349/110; 349/122
[58] Field of Search .................. 359/56, 68, 74, 359/891; 430/7; 345/88; 349/106, 107, 108, 109, 110, 122, 172

[56] References Cited

U.S. PATENT DOCUMENTS

| | | | |
|---|---|---|---|
| 4,367,924 | 1/1983 | Clark et al. | 350/334 |
| 4,655,561 | 4/1987 | Kanabe et al. | 359/56 |
| 4,712,874 | 12/1987 | Sekimura et al. | 359/75 |
| 4,744,637 | 5/1988 | Sekimura et al. | 359/68 |
| 4,786,148 | 11/1988 | Sekimura et al. | 350/339 |
| 5,078,475 | 1/1992 | Sekimura et al. | 359/68 |
| 5,101,289 | 3/1992 | Takao et al. | 359/68 |

FOREIGN PATENT DOCUMENTS

| | | | |
|---|---|---|---|
| 0127227 | 5/1988 | Japan | 359/79 |
| 0114820 | 5/1989 | Japan | 359/68 |

OTHER PUBLICATIONS

Schadt et al. "Applied Physics Letters", vol. 18, No. 4, pp. 127–128 Feb. (1971).
Clark et al. "Applied Physics Letters", vol. 36, No. 11, pp. 899–901 (Jun. 1980).
Meyer et al. "Journal de Physique, Letters" vol. 36, pp. L69–L71 (1975).
Kotai et al. "Solid State Physics", vol. 16, pp. 13–23 (1981).

*Primary Examiner*—William L. Sikes
*Assistant Examiner*—Tai V. Duong
*Attorney, Agent, or Firm*—Fitzpatrick, Cella, Harper & Scinto

[57] ABSTRACT

A ferroelectric liquid crystal device comprises a ferroelectric liquid crystal held between a pair of parallel substrates each provided with transparent electrodes formed thereon, and color filters formed between the transparent electrode and the substrate at least on one side. In the device, a difference in surface roughness between the color filters for all the pixels is less than 0.1 μm. With this device, the occurrence of orientation defects is prevented and excellent characteristics specific to a ferroelectric liquid crystal are sufficiently developed.

16 Claims, 5 Drawing Sheets

FERROELECTRIC LIQUID CRYSTAL DEVICE AND DISPLAY HAVING MAXIMUM PEAK OF SURFACE ROUGHNESS OF COLOR FILTER OF 0.1 MICRON OR LESS

This application is a continuation of application Ser. No. 07/791,235, filed Nov. 13, 1991, now abandoned.

BACKGROUND OF THE INVENTION

1. Field of the Invention

The present invention relates to a ferroelectric liquid crystal device such as a liquid crystal display device or a liquid crystal—optical shutter array, and more particularly to a ferroelectric liquid crystal device having color filters in which the initial orientation state of liquid crystal molecules is improved to obtain a uniform monodomain liquid crystal phase free from orientation defects for an improvement in display and driving characteristics.

2. Related Background Art

There is conventionally known a liquid crystal device using a twisted nematic liquid crystal which is described in an article of M. Schadt and W. Helfrich, "Voltage Dependent Optical Activity of a Twisted Nematic Liquid Crystal", Applied Physics Letters, Vol. 18, No. 4 (Feb. 15, 1971). This TN liquid crysral has limitations in the number of pixels available for the problem of causing crosstalk when it is driven in a time sharing manner using the matrix electrode structure with the increased pixel density.

There is also known a display device in which a switching element formed of a thin film transistor is connected to each pixel and switched over pixel by pixel. This type display device however suffers from the problem that the process of forming thin film transistors on a substrate is very intricate and difficulties are experienced in fabricating the display device of large area.

To solve the above problems, Clark, et al. have proposed a ferroelectric liquid crystal device in U.S. Pat. No. 4,367,924.

FIG. 2 schematically shows an example of a cell for explaining operation of a ferroelectric liquid crystal. Denoted by 21a and 21b each are a substrate (glass plate) coated with a thin film of $In_2$, $SnO_2$, ITO (Indium Tin Oxide) or the like, and a liquid crystal in the SmC* or SmH* phase including a plurality of liquid crystal molecular layers 22, oriented perpendicularly to the glass surfaces, is enclosed between the two substrates. A fat line 23 represents a liquid crystal molecule which has a dipole moment (P1) 24 in a direction orthogonal to the molecule. When a voltage greater than a certain threshold is applied between the electrodes on the substrates 21a and 21b, the spiral structure of the liquid crystal molecules 23 becomes loose, enabling orientation of the liquid crystal molecules 23 to be changed so that all of the dipole moments (P1) 24 are directed in the direction of the electric field applied. Each liquid crystal molecule 23 has an elongate shape and thus has anisotropy in the refractive index between directions of the long axis and the short axis. It is therefore easily understood by placing two polarizers above and under the glass plates in a positional relationship of the so-called crossed-Nichol, for example, a liquid crystal optical modulator can be obtained which has optical characteristics depending on the polarity of the applied voltage.

A liquid crystal cell preferably used in a ferroelectric liquid crystal device of the present invention can be sufficiently reduced in its thickness (e.g., below 10 μm). As the liquid crystal phase becomes so thin, the spiral structure of the liquid crystal molecules is loosened into the non-spiral structure even in a condition that no electric field is applied, as shown in FIG. 3, where the dipole moment Pa or Pb takes either an upward (34a) or downward (34b) state. When an electric field Ea or Eb greater than a certain threshold and different in the polarity is applied to such a cell as shown in FIG. 3, the dipole moment changes its state to the upward direction 34a or the downward direction 34b corresponding to a vector of the electric field Ea or Eb, whereupon the liquid crystal molecule is oriented to either one of a first stable state 33a and a second stable state 33b.

Using the above ferroelectric liquid crystal as an optical modulator offers two advantages. The first is in that a response speed is very high and the second is in that orientation of the liquid crystal molecule has bistability. The latter advantage will now be described in more detail with reference to FIG. 3. When the electric field Ea is applied, the liquid crystal molecule is oriented to the first stable state 33a and this state remains stable even after the electric field is turned off. When the electric field Eb opposite to Ea is applied in that condition, the liquid crystal molecule is oriented to the second stable state 33b for change in the molecular direction, and this state also remains stable even after the electric field is turned off. In addition, as far as the applied electric field Ea does not exceed a certain threshold, the liquid crystal molecule is kept in the respective stable state as it is. To effectively realize such a high response speed and bistability, the cell is preferably as thin as possible.

For the ferroelectric liquid crystal device to exhibit desired driving characteristics, a ferroelectric liquid crystal arranged between a pair of parallel substrates is required to have such a molecular array state that conversion between the above two stable states effectively occurs regardless of the applied condition of the electric field. As to the ferroelectric liquid crystal having a chiral smectic phase, for example, it is required to form a region (monodomain) in which liquid crystal molecule layers in the chiral smectic phase are perpendicular to the substrate surfaces; hence, the liquid crystal molecule axes are arrayed substantially parallel to the substrate surfaces. In conventional ferroelectric liquid crystal devices, however, the orientation state of liquid crystal molecules having such a monodomain structure has not always been formed in a satisfactory manner, thus making it impossible to provide sufficient characteristics up to the present.

FIG. 4 is a schematic view showing a section of one conventional ferroelectric liquid crystal device.

A conventional ferroelectric liquid crystal device 40 shown in FIG. 4 has a pair of parallel electrodes 41 and 42 which are provided with stripe-shaped transparent electrodes 43 and 44 each having the matrix electrode structure, respectively.

While color filters are generally comprised of respective layers containing coloring matters in red (R), green (G), blue (B), or others, there have been widely studied color filters of the type using organic pigments so as to present excellent various characteristics in recent years. For this type color filter using organic pigments, because the organic pigments are present within the color filter in a state of dispersed particles, the color filter has fine surface roughness. Further, because the dispersion state is different depending on various kinds of organic pigments used, a difference larger than 0.1 μm usually occurs in the surface roughness (maximum height: representing a value defined by Rmax JIS-B0601 (described later)) between color filters in red (R), green (G), blue (B) or others. As a result, when orientation control is carried out by utilizing the temperature descending process, the above difference in the surface roughness between the different colors causes orientation defects in a ferroelectric liquid crystal 47.

If the difference in the surface roughness of at least 0.1 μm or more exists locally at the surface contacting the ferroelectric liquid crystal as mentioned above, orientation defects occur from the portion including the difference in the surface roughness, which impedes the ferroelectric liquid crystal from forming the monodomain.

SUMMARY OF THE INVENTION

The inventors have found out from experiments that the above-stated difference in surface roughness of the color filters is responsible for causing orientation defects in a ferroelectric liquid crystal.

An object of the present invention is to provide a ferroelectric liquid crystal device which can prevent the occurrence of such orientation defects and can sufficiently exhibit a high-speed response and memory effect characteristics that are possessed by the ferroelectric liquid crystal device in itself.

Particularly, by turning eyes to initial orientation in the temperature descending process in which a ferroelectric liquid crystal transits from a isotropic phase (high-temperature state) to a liquid crystal phase (low-temperature state), the inventors have found out a ferroelectric liquid crystal device having the structure that is compatible in realizing desired operating characteristics of the device based on bistability of the ferroelectric liquid crystal and forming a monodomain in a liquid crystal layer.

The ferroelectric liquid crystal device of the present invention has been made on the basis of such findings, and more particularly has a feature that by eliminating the difference in surface roughness at the surfaces of color filters contacting the liquid crystal layer, i.e., preventing any abrupt changes from occurring at the interface between the color filters and the liquid crystal layer, the ferroelectric liquid crystal takes a satisfactory state of initial orientation in the temperature descending process and thus can form a monodomain free of orientation defects.

In other words, the present invention resides in a ferroelectric liquid crystal device comprising a ferroelectric liquid crystal held between a pair of parallel substrates each provided with transparent electrodes formed thereon, and color filters having a substantially constant film thickness and formed between the transparent electrode and the substrate at least on one side, wherein the uniformity of the surface roughness of the color filters prevents orientation defects among the pixels.

DETAILED DESCRIPTION OF THE PREFERRED EMBODIMENTS

Hereinafter, the present invention will be described with reference to the drawings.

Figure 1:
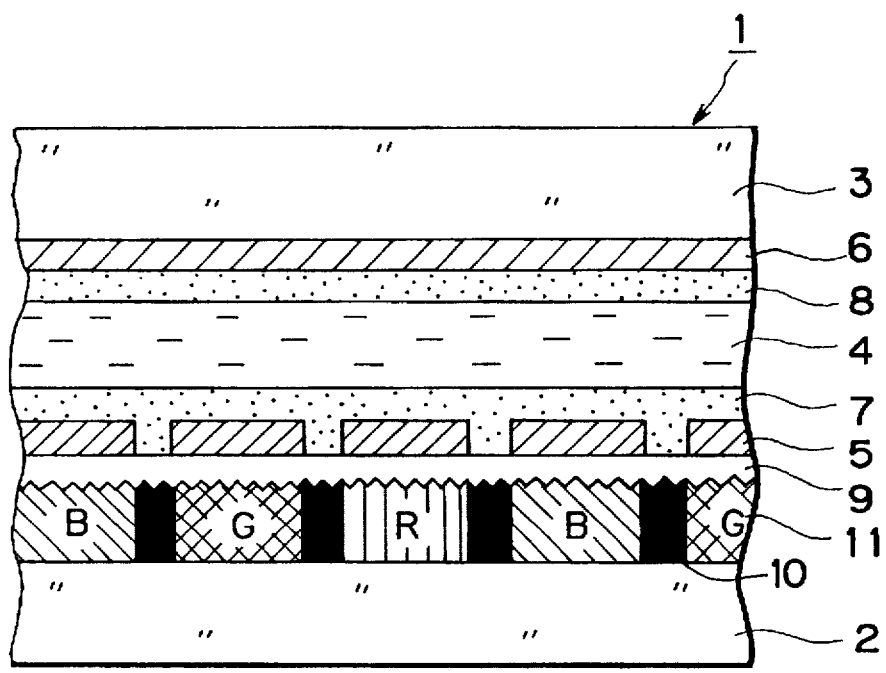
FIG. 1 is a sectional view schematically showing a basic structure of a ferroelectric liquid crystal device according to the present invention.
Figure 2:
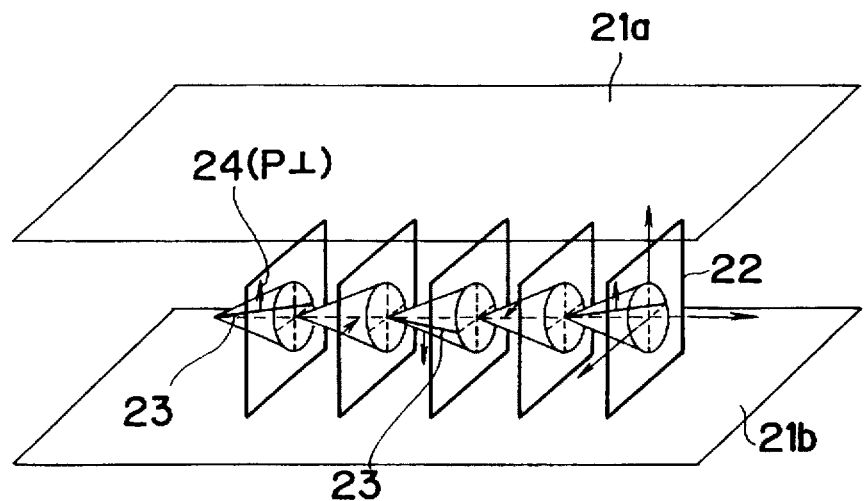
FIGS. 2 and 3 are perspective views schematically showing principles of the ferroelectric liquid crystal device for use in the present invention.
Figure 3:
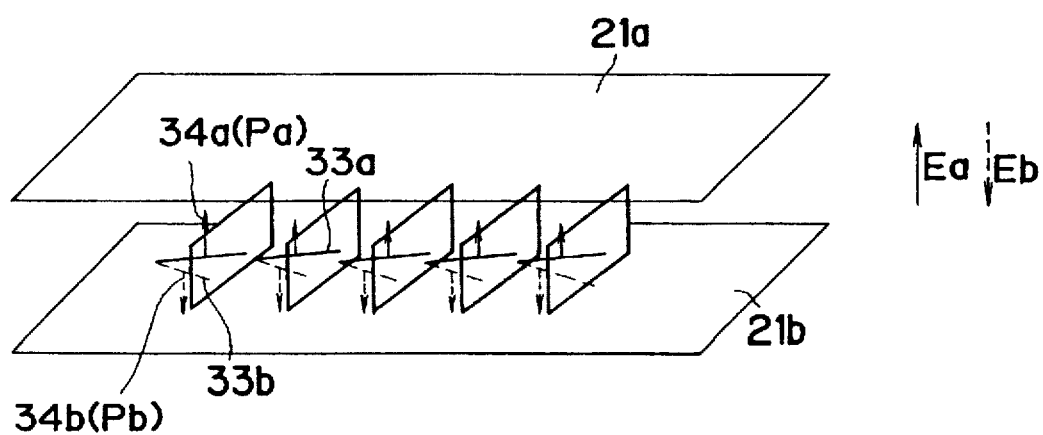
Figure 4:
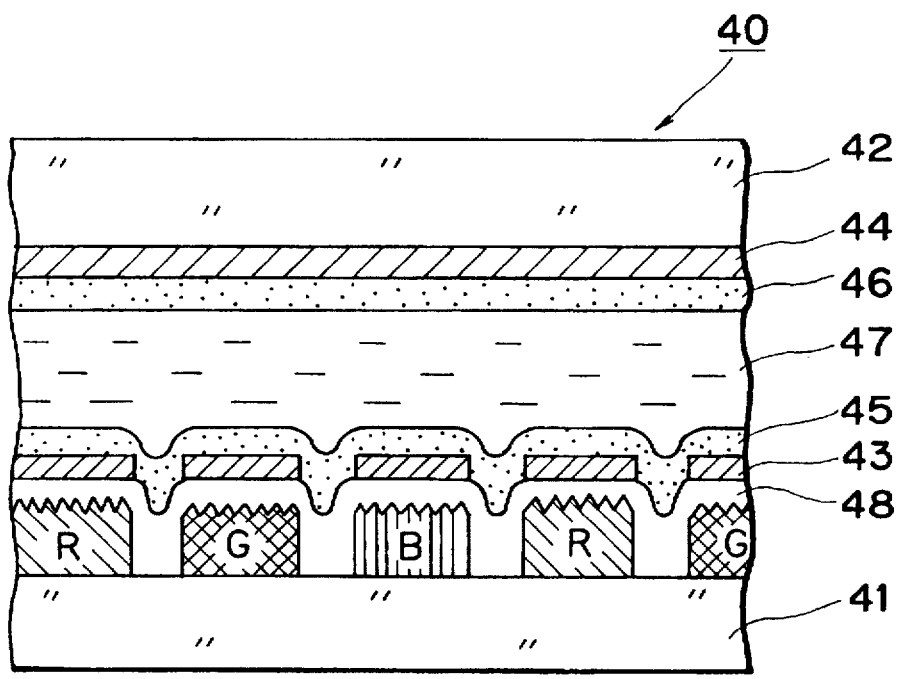
FIG. 4 is a sectional view showing a conventional ferroelectric liquid crystal device.

FIG. 1 is a sectional view schematically showing a basic structure of a ferroelectric liquid crystal device according to the present invention. In FIG. 1, a ferroelectric liquid crystal device 1 has a pair of substrates 2 and 3 each formed of a transparent plate such as a glass or plastic plate, with a ferroelectric liquid crystal 4 held therebetween. The substrates 2 and 3 are provided with transparent electrodes 5 and 6 shaped into a striped pattern and forming the matrix electrode structure, and orientation control films 7 and 8 are formed on the transparent electrodes 5 and 6, respectively. Color filters 11 comprising R (red), G (green) and B (blue) regions are formed by selecting densities of coloring materials beforehand so that desired spectroscopic characteristics are obtained at the same film thickness, and by using transparent fine particles dispersed and mixed with the coloring materials beforehand so that the color filters have uniform surface roughness for all the color regions. If necessary, a light shielding layer 1 is formed in each recess between the adjacent two color filters 11, and a protective film or flattening film 9 is formed on the light shielding layer 1 and the color filters 11.

With the above structure, because the difference in local surface roughness between the color filters 11 in different colors is compensated, the surface roughness at the interface between the color filters and the liquid crystal layer 4 can be kept substantially constant even if the transparent electrode 5 and the orientation control film 7 are successively formed on pixels.

In the present invention, while the above structure for uniformalizing the surface roughness can reduce the difference in surface roughness between the color filters 11 in different colors can down below 0.1 μm, that difference is preferably less than 0.05 μm. Further, it is desired that the surface roughness of the color filter itself in each color is as small as possible. Specifically, the surface roughness Rmax should be <0.5 μm, preferably 0.1 μm.

The term "surface roughness" will now be explained. The term "surface roughness" used in this specification implies the maximum height (Rmax) by B0601, Definitions and Designation of Surface Roughness, of JIS (Japanese Industrial Standards).

The maximum height Rmax is obtained by extracting a reference length (0.25 mm in the present invention) from the sectional curved line, sandwiching the extracted portion by two straight lines parallel to an average line of the extracted portion, and measuring the spacing between the two straight lines in a direction of vertical magnification of the sectional curved line, and it is expressed in units of micrometer (μm).

Binders used to form colored resin films of the color filters 11 in the present invention are preferably aromatic polyamide or polyimide resin that has a photosensitive group in each molecule, especially that shows no specific light absorption characteristics in a wavelength range (400 to 700 nm) of visible light (in terms of light transmissivity over 90%). From this viewpoint, aromatic polyamide resin is more preferable.

The above photosensitive group in the present invention may be of an aromatic chain having a photosensitive unsaturated group of hydrocarbon. Several examples of such an aromatic chain are as follows.

(1) Benzoic esters

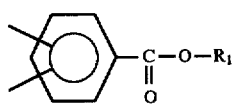

(where $R_1$ is CHX=CY—COO—Z—, X is —H or —$C_6H_5$, Y is —H or —$CH_3$, and Z is — or an ethyl group or glycizyl group)

(2) Benzyl acrylates

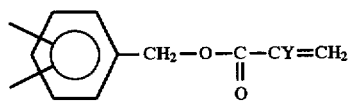

(where Y is —H or $CH_3$)

(3) Diphenyl ethers

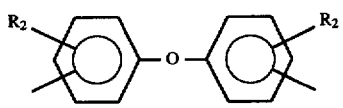

(where $R_2$ is a group containing one or more CHX=CY—CONH—, $CH_2$=CY—COO—$(CH_2)_2$—OCO or $CH_2$=CY—COO—$CH_2$—, and X, Y are as per defined above)

(4) Chains of chalcones and other compounds

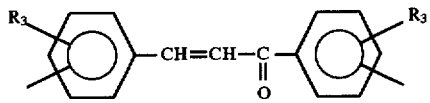

(where $R_3$ is H—,and alkyl group or an alkoxy group)

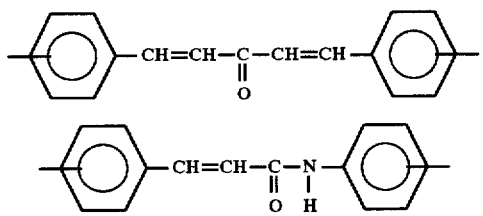

Commercialized examples of aromatic polyamide or polyimide resin having any of the foregoing in each molecule are "Lithocoat PA-1000" (Trade Name, by Ube Industries, Ltd. ), "Lithocoat PI-1000" (Trade Name, by Ube Industries, Ltd.), etc.

Photosensitive resins for use in the photolithographic process are generally few excellent, though depending on the chemical structures to some extent, in mechanical characteristics and durability such as against heat, light and solvent. On the contrary, the photosensitive polyamide or polyimide resin in the present invention is excellent in stability against those matters from the standpoint of the chemical structure as well. Thus, durability of the color filters formed by using such resin becomes also very excellent. In particular, such a superior property is effective to overcome the problems experienced in manufacturing the color filters of the ferroelectric liquid crystal device, e.g., heat resistance required at the time of sputtering the transparent conductive films and possible damages of the color filters by inner spacers at the time of assembling the liquid crystal device.

Coloring materials used to form colored resin layers of the color filters 11 in the present invention are not specifically limited and may be any of organic pigments, inorganic pigments, dyes, etc. so long as desired spectroscopic characteristics are obtained. Those coloring materials may be used in the single form or in the form of mixture containing several materials. In the case of using dyes, however, performance of the color filter is restricted by durability of the dye itself. On the contrary, using the polyamide or polyimide resin of the present invention enables to provide more excellent performance than usual dyed color filters. In view of color characteristics and other various properties of the color filter, therefore, organic pigments are most preferable as coloring materials.

Examples of the organic pigments are azo-base pigments such as including dissolvable azo, insoluble azo or condensed azo compounds, phthalocyanine-base pigments, condensed polycyclic compound-base pigments including as indigo, anthraquinone, perylene, perynone, dioxazine, quinacridone, isoindolinone, phthalone, methine—azomethine or other metal complex, and a mixture of some of those pigments.

The transparent fine particles used to uniformalize the surface roughness of the color filters 11 in the present invention may be of one or a mixture of two or more selected from inorganic particles such as $SiO_2$, SiO, $Al_2O_3$, $Si_3N_4$ or $Ta_2O_5$, and organic fine particles such as polyacryl, polystylene, polyamide, polyimide, polyurethane, polycarbonate or silicon.

Though depending on a degree of surface roughness to be controlled, it is generally preferable that the transparent fine particles have the mean particle size less than 0.5 µm.

Coloring resin used to form the aforesaid colored resin layers is prepared by mixing each of the coloring materials, preset so that desired spectroscopic characteristics are obtained substantially at the same film thickness for all the colors, with a solution of the photosensitive polyamide or polyimide resin in a proportion ranging from 10 to 50 wt. %, preferably 30 to 50 wt. %, mixing the transparent fine particles, serving to adjust the surface roughness to be substantially constant, in a proportion ranging from 0 to 20 wt. %, preferably 0 to 10 wt. %, and dispersing mixed materials sufficiently by using ultrasonic waves, a unit of three rolls or the like, followed by removing the remained grains having a greater particle size through a filter with the mesh size of 1 µm, preferably.

The colored resin layers of the color filters in the present invention are each formed by coating the colored resin over the substrate by an applicator such as a spinner or roll coater, and then patterning the coated resin through a photolithographic process. While the thickness of the colored resin layer is determined depending on the desired spectroscopic characteristics, it is usually in a range of 0.5 to 5 µm, preferably in a range of 0.5 to 1.5 µm, with substantially the same film thickness for all the colors.

Because a too large surface roughness of each color filters leads to the occurrence of orientation defects, the maximum difference in surface roughness should be less than 0.1 µm, preferably less than 0.05 µm.

In the case of requiring to further increase adhesion between the colored resin layers and the underlying substrate, it is effective to coat a thin film of a silane coupling agent or the like on the substrate beforehand and then pattern the colored resin, or form the color filters using a mixture prepared by adding a small amount of a silane coupling agent or the like into the colored resin beforehand.

The colored resin layers of the color filters in the present invention is formed of a material that has satisfactory and sufficient durability in itself, as mentioned before. For the purpose of especially protecting the colored resin layers or flattening the surfaces of the color filters in view of various environmental conditions, organic resin such as polyamide, polyimide, polyurethane, polycarbonate or silicon, or an inorganic film such as $Si_3N_4$, $SiO_2$, $SiO$, $Al_2O_3$ or $Ta_2O_3$ may be provided as the protective film or flattening film 9 by the coating method such as spin coating and roll coating, or the evaporation method. Further, the thickness of the protective film 9 can be used to determine the thickness of the ferroelectric liquid crystal 4 and thus changes depending on the kind of liquid crystal materials used and a response speed demanded. But it is generally set to fall in a range of 0.2 to 20 μm, preferably in a range of 0.5 to 10 μm.

In addition, for the purpose of improving display characteristics, the light shielding layer 10 may be provided by any of the following three methods.

(1) A light shielding pattern is formed through the photolithographic process over the glass substrate, the colored resin pattern, or the protective film or flattening film in match with the recesses between every adjacent pixels, by using light shielding resin resulted from dispersing a light shielding material, such as carbon black, iron black, black lead, black pigments of composite oxides of copper—chromium or copper—iron—manganese, or other metal powder having a light shielding capability, into the similar photosensitive polyamino resin as used for the colored resin layers.

(2) A light shielding pattern is formed by coating a metal thin film such as chromium and aluminum, having a light shielding capability through evaporation, sputtering or the like over the glass substrate, the colored resin pattern, or the protective film or flattening film, forming a resist mask in match with the recesses between every adjacent pixels, and then etching away the metal thin films on the pixels.

(3) When forming the colored resin pattern on the glass plate, every adjacent end portions (approximately 2 to 15 μm) of the colored resin pattern in different two colors are overlapped to form a light shielding pattern simultaneously, following which the protective film or flattening film is provided on the color filter layer so as to flatten the entire surface inclusive of the overlapped portions.

The thickness of the light shielding layer 10 making up the light shielding pattern is set so that the surface on which the transparent electrodes are formed is made substantially flat.

Material of the orientation control film 7 used in the present invention is formed of, for example, one selected from resins such as polyvinyl alcohol, polyimide, polyamideimide, polyester, polycarbonate, polyvinyl acetal, polyvinyl chloride, polyvinyl acetate, polyamide, polystyrene, cellulose resin, melamine resin, urea resin and acryl resin, or photosensitive polyimide, photosensitive polyamide, cyclic rubber-base photoresist, phenol borac-base photoresist or electron beam photoresist (e.g., polymethyl methacrylate or epoxidized—1,4-polybutadiene). Though depending on the layer thickness of the ferroelectric liquid crystal 4, the thickness of the orientation control film 7 is usually set in a range of 10 Å to 1 μm, preferably in a range of 100 Å to 3000 Å.

The most suitable liquid crystal material used in the present invention is a liquid crystal which has bistability and ferroelectricity. More specifically, a liquid crystal in a chiral smectic C phase (SmC*), H phase (SmH*), I phase (SmI*), J phase (SmJ*), K phase (SmK*), G phase (SmG*) or F phase (SmF*) can be used.

Those ferroelectric liquid crystals are described in "Ferroelectric Liquid Crystals", LE JOURNAL DE PHYSIQUE LETTERS, 1975, 36 No. (L-69); "Submicro Second Bistable Electrooptic Switching in Liquid Crystals", Applied Physics Letters, 1980, 36 No. (11); "Liquid Crystals", Solid State Physics (Japan), 1981, 16 No. (141), and so on. Any of the ferroelectric liquid crystals disclosed in the above references can be employed in the present invention.

Practical examples of the ferroelectric liquid crystal 4 are, for example, desiloxybenzylidene-p'-amino-2-methylbutylcinnamate (DOBAMBC), hexyloxybenzylidene-p'-amino-2-chloropropylcinnamate (HOBACPC), and 4-o-(2-methyl)-butylresorcilidene-4'-octylaniline (MBRAS).

When the device is constituted by using any of those materials, it may be supported by a block or the like with a heater built therein, if necessary, so that the liquid crystal compound is held at such a temperature as exhibiting the chiral smectic phase.

With the ferroelectric liquid crystal of the present invention, since the color filters corresponding to the respective pixels are formed to have substantially the same film thickness and all the pixels are made uniform in surface roughness, there occurs no difference in surface roughness at the surface contacting the liquid crystal layer. Accordingly, by conducting slow-cooling in the temperature descending process for transition from an isotropic phase into a liquid crystal phase, a region of the liquid crystal phase is gradually spread so as to form a liquid crystal in a uniform monodomain phase.

To put it in more detail by taking the aforesaid DOBAMBC, which exhibits a ferroelectric liquid crystal phase, as an example of the liquid crystal, as DOBAMBC is gradually cooled from an isotropic phase, it transits to a smectic A phase (SmA phase) about 115° C. At this time, if the substrate is subjected to orientation treatment such as rubbing or oblique evaporation of $SiO_2$, a monodomain phase is formed in which the molecular axes of liquid crystal molecules are oriented parallel to the substrate and pointing in one direction. As DOBAMBC further continues to be cooled, there occurs phase transition to the chiral smectic phase (SmC*) at a specific temperature in a range of about 90° to 75° C. depending on the thickness of the liquid crystal layer. In addition, when the thickness of the liquid crystal is less than about 2 μm, the spiral structure of the SmC* phase becomes loose to exhibit bistability.

Hereinafter, the present invention will be explained in more detail by referring to Examples.

EXAMPLE 1

FIGS. 5A to 5F are views showing successive steps for fabricating color pixels in three colors R, G, B.

First, a blue colored resin material [photosensitive colored resin material prepared by dispersing Heliogen Blue L7080 (Trade Name, by BASF Co., C.I. No. 74160) and $SiO_2$-base fine particles) [AEROSIL (Trade Name, by Japan Aerosil Co. Ltd.)] into PA-1000C (Trade Name, by Ube industries, Ltd., containing polymer=10%, solvent: N-methyl-2-pyrrolidone, and $SiO_2$-base fine particles=5 wt. % at mixing ratio of pigment:polymer =1:2)] was coated 1.5 μm thick over a #7059 glass substrate 51 available from Coning, Co. by the spinner coating method to form a colored resin layer 52. (See FIG. 5A)

Then, after prebaking at 80° C. for 10 minutes, the colored resin layer 52 was exposed by a high-pressure mercury lamp via a photomask corresponding to the pattern to be formed. (See FIG. 5B)

Figure 5A:
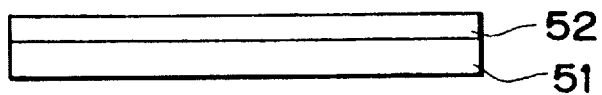
FIGS. 5A to 5F are views showing successive steps of manufacturing a substrate of the ferroelectric liquid crystal device according to the present invention.
Figure 5B:
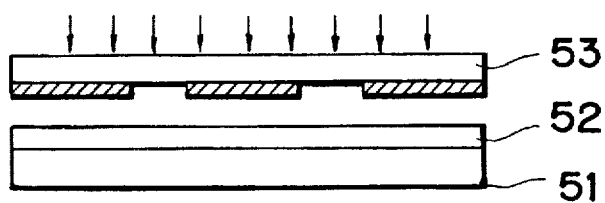
Figure 5C:
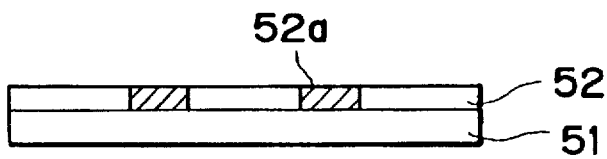
Figure 5D:
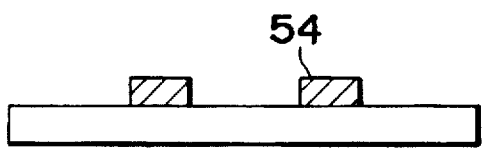
Figure 5E:
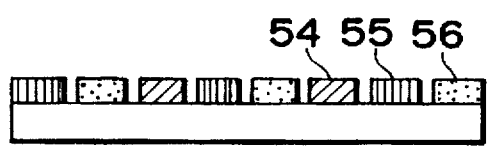
Figure 5F:
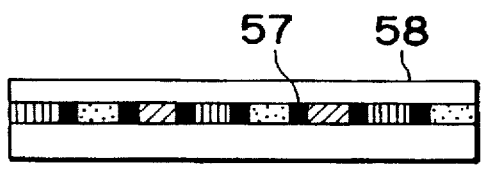

After completion of the exposure, as shown in FIG. 5C, the colored resin layer 52 was developed under ultrasonic waves by using a developing solution (containing N-methyl-2-pyrrolidone as a main ingredient) which can dissolve only the unexposed portions of the colored resin layer 52 having light hardened portions 52a, and treated with a specific rinsing solution (e.g., containing isopropyl alcohol as a main ingredient). Thereafter, postbaking was made at 200° C. for 30 minutes to form a patterned and blue colored resin layer 54. (See FIG. 5D)

Subsequently, a patterned and green colored resin layer 55 was formed as a second color filter at predetermined locations over the glass substrate, having the blue colored pattern formed thereon, in a like manner to the above except using a green colored resin material [photosensitive colored resin material prepared by dispersing Lionol Green 6YK (Trade Name, by Toyo Ink Co., Ltd., C.I. No. 74265) and SiO$_2$-base fine particles [AEROSIL (Trade Name, by Japan Aerosil Co. Ltd.)] into PA-1000C (Trade Name, by Ube industries, Ltd., containing polymer=10%, solvent:N-methyl-2-pyrrolidone, and SiO$_2$-base fine particles=1 wt. % at mixing ratio of pigment:polymer=1:2)].

Further, a patterned and green colored resin layer 56 was formed as a third color filter at predetermined locations over the glass substrate, having the blue and green colored patterns formed thereon, in a like manner to the above except using a red colored resin material [photosensitive colored resin material prepared by dispersing Irgazin Red BPT (Trade Name, by Ciba-Geigy Co., C.I. No. 71127) into PA-1000C (Trade Name, by Ube Industries, Ltd., containing polymer=10% and solvent:N-methyl-2-pyrrolidone, at mixing ratio of pigment:polymer=1:2)]. Thus, three striped patterns in R (red), G (green) and B (blue) colors were obtained. (See FIG. 5E)

The thus-obtained color filters in blue, green and red each had surface roughness uniformalized in a range of Rmax= 0.2 to 0.3 μm.

Then, a light shielding layer 57 was formed as a light shielding pattern over the glass substrate, having the three colored patterns formed thereon, in match with the gaps between the adjacent pixels in a like manner to the above by using a black colored resin material [photosensitive colored resin material prepared by dispersing carbon black (C.I. No. 77266) into PA-1000C (containing polymer=10% at mixing ratio of pigment:polymer =1:4).

Over the color filter patterns obtained in this way, a transparent resin material [PA-1000C (Trade Name, by Ube Industries, Ltd., containing polymer=10%, solvent:N-methyl-2-pyrrolidone] similar to that used in the above colored resin material was coated about 1.0 μm thick by the spinner coating method. (See FIG. 5F)

As a result, a color filter substrate having surface roughness made uniform for all the pixels could be formed.

Next, as shown in FIG. 1, ITO was formed 500 Å thick through sputtering to provide the transparent electrodes 5. Over the transparent electrodes 5, a polyimide forming solution ("PIQ" by Hitach Chemical Co., Ltd.) was coated as the orientation control film 7 by a spinner rotating at 3000 rpm, followed by heating at 250° C. for 30 minutes to form a polyimide coating with a thickness of 2000 Å. After that, the surface of the poltimide coating was treated by rubbing.

The color filter substrate thus formed and the substrate 3 as a counterpart were bonded in opposite relation to assemble a cell, and a ferroelectric liquid crystal was injected into the cell and sealed off, thereby obtaining a liquid crystal device. Observing the liquid crystal device by the use of a polarizing microscope with the crossed-Nichol arrangement, it was confirmed that internal liquid crystal molecules were free from orientation defects.

EXAMPLE 2

Three striped color filters in R, G and B were obtained in a like manner to Example 1 except using a photosensitive colored resin material [prepared by finely dispersing Heliogen Blue L7080 (Trade Name, by BASF Co., C.I. No. 74160) into PA-1000C (Trade Name, by Ube industries, Ltd., containing polymer =10% and solvent:N-methyl-2-pyrrolidone at mixing ratio of pigment:polymer =1:2) by means of a sand grinder] as the blue colored resin material, a photosensitive colored resin material [prepared by finely dispersing Lionol Green 6YK (Trade Name, by Toyo Ink Co., Ltd., C.I. No. 74265) into PA-1000C at the same mixing ratio as above by means of a sand grinder] as a green colored resin material, and a photosensitive colored resin material [prepared by finely dispersing Irgazin Red BPT (Trade Name, by Ciba-Geigy Co., C.I. No. 71127) into PA-1000C at the same mixing ratio as above by means of a sand grinder] as a red colored resin material. The resulting three color filters respectively had the surface roughness of Rmax=0.18 μm for R, Rmax =0.21 μm for G and Rmax= 0.17 μm for B. Thus, the maximum difference in surface roughness between the different color filters was 0.04 μm.

Thereafter, a cell similar to that in Example 1 was assembled and a satisfactory liquid crystal device free from orientation defects was obtained.

EXAMPLE 3

Figure 6:
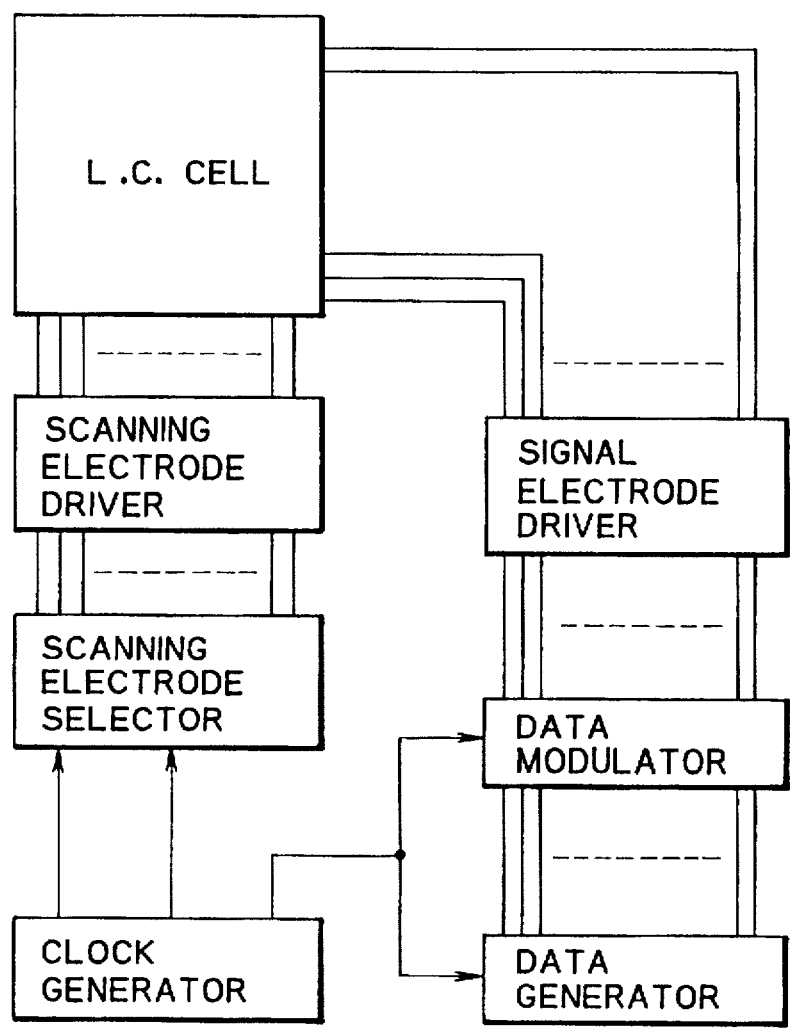
FIG. 6 is an electric block diagram in the case that the ferroelectric liquid crystal device of the present invention is utilized as a liquid crystal display.

FIG. 6 schematically shows one example of an electric block diagram in the case that the ferroelectric liquid crystal device of the present invention is driven as a liquid crystal display.

Signals applied to a group of scanning electrodes are obtained by sending a clock signal generated from a clock generator to a scanning electrode selector which selects the scanning electrodes in sequence, and then sending outputs of the scanning electrode selector to a scanning electrode driver.

On the other hand, signals applied to a group of signal electrodes are obtained by sending output signals of a data generator and the clock signal to a data modulator which can form information signals and auxiliary signals therefrom, and then supplying those signals through a signal electrode driver.

As a result of an image display test for the liquid crystal display having the electric system thus arranged, satisfactory images could be produced.

According to the present invention, as described above, since the color filter layers on the substrate have no difference in film thickness and also have surface roughness made uniform for all the pixels, the occurrence of orientation defects due to the difference in surface roughness can be prevented, making it possible to provide a ferroelectric liquid crystal device in which an ferroelelectric liquid crystal can sufficiently develop their specific characteristics.

Furthermore, according to the present invention, color filter portions having fine patterns, which are excellent not only in mechanical strength, but also in various characteristics such as durability against heat, light and solvent, can be fabricated through the simple manufacture process, making it possible to readily provide a color ferroelectric liquid crystal device with superior performance.

In addition, by using the ferroelectric liquid crystal device of the present invention in a liquid crystal display, there is provided a liquid crystal display which can display satisfactory images.

What is claimed is:

1. A ferroelectric liquid crystal device comprising a ferroelectric liquid crystal held between a pair of parallel substrates each provided with transparent electrodes formed thereon, and color filters formed on at least one of said substrates between said at least one substrate and said transparent electrodes thereon, wherein a difference in maximum height (R max) among said color filters for all the pixels is less than 0.1 µm as measured by JIS B0601.

2. A ferroelectric liquid crystal device according to claim 1, wherein the difference in maximum height (R max) is less than 0.05 µm.

3. A ferroelectric liquid crystal device according to claim 1, wherein said color filters are formed of aromatic polyamide resin or polyimide resin having a photo-sensitive group in each molecule.

4. A ferroelectric liquid crystal device according to claim 1, wherein said color filters comprise transparent fine particles and at least one coloring material.

5. A ferroelectric liquid crystal device according to claim 1, wherein said color filters are formed by finely dispersing pigments in a polymer.

6. A ferroelectric liquid crystal device according to claim 1, further comprising a protective film between said color filters and said transparent electrodes.

7. A ferroelectric liquid crystal device according to claim 1, further comprising a light shielding layer between every adjacent color filters for all the pixels.

8. A ferroelectric liquid crystal display comprising:
a ferroelectric liquid crystal device having a ferroelectric liquid crystal held between a pair of parallel substrates each provided with transparent electrodes formed thereon, and color filters formed on at least one of said substrates between said at least one substrate and said transparent electrodes thereon, in which device a difference in maximum height (R max) among said color filters for all the pixels is less than 0.1 µm, as measured by JIS B0601, and
a clock generator, a scanning electrode selector, a scanning electrode driver, a data generator, a data modulator, and a signal electrode driver in operable combination with said ferroelectric liquid crystal device.

9. A ferroelectric liquid crystal device comprising two substrates each provided with transparent stripe electrodes formed thereon, said two substrates being arranged in opposite relation with said transparent stripe electrodes on one substrate crossing said transparent stripe electrodes on the other substrate perpendicularly so as to form pixels, and color filters of different colors from each other respectively provided for a plurality of groups into which said pixels are divided, wherein a difference in maximum height (R max) among said color filters for all the colors is less than 0.1 µm as measured by JIS B0601.

10. A ferroelectric liquid crystal device according to claim 9, wherein the difference in maximum height (R max) is less than 0.05 µm.

11. A ferroelectric liquid crystal device according to claim 9, wherein said color filters are formed of aromatic polyamide resin or polyimide resin having a photo-sensitive group in each molecule.

12. A ferroelectric liquid crystal device according to claim 9, wherein said color filters comprise transparent fine particles and at least one coloring material.

13. A ferroelectric liquid crystal device according to claim 9, wherein said color filters are formed by finely dispersing pigments in a polymer.

14. A ferroelectric liquid crystal device according to claim 9, further comprising a protective film between said color filters and said striped transparent electrodes.

15. A ferroelectric liquid crystal device according to claim 9, further comprising a light shielding layer between every adjacent color filters for all the colors.

16. A ferroelectric liquid crystal device comprising:
a ferroelectric liquid crystal device comprising two substrates each provided with transparent stripe electrodes formed thereon, said two substrates being arranged in opposite relation with said transparent stripe electrodes on one substrate crossing said transparent stripe electrodes on the other substrate perpendicularly so as to form pixels, and color filters of different colors from each other respectively provided for a plurality of groups into which said pixels are divided, wherein a difference in maximum height (R max) among said color filters for all the colors is less than 0.1 µm as measured by JIS B0601, and
a clock generator, a scanning electrode selector, a scanning electrode driver, a data generator, a data modulator, and a signal electrode driver in operable combination with said ferroelectric liquid crystal device.

* * * * *

UNITED STATES PATENT AND TRADEMARK OFFICE
CERTIFICATE OF CORRECTION

PATENT NO. : 5,734,456

DATED : March 31, 1998

INVENTOR(S) : HIDEAKI TAKAO ET AL.

Page 1 of 4

It is certified that error appears in the above-identified patent and that said Letters Patent is hereby corrected as shown below:

COLUMN 1

Line 26, "crysral" should read --crystal--; and
    Line 58, "by" should read --that by--.

COLUMN 2

Line 24, "far" should read --long--.

COLUMN 3

Line 23, "turning eyes to" should read --considering the--;
    Line 25, "a" should read --an--;
    Line 27, "found out" should read --discovered--; and
    Line 28, "the" should read --a-- and
         "compatible in" should read --capable of--.

COLUMN 4

Line 35, "uniformalizing" should read --uniformizing--;
    Line 37, "can down" should be deleted; and
    Line 54, "micrometer" should read --micrometers--.

UNITED STATES PATENT AND TRADEMARK OFFICE
CERTIFICATE OF CORRECTION

PATENT NO. : 5,734,456

DATED : March 31, 1998

INVENTOR(S) : HIDEAKI TAKAO ET AL.

Page 2 of 4

It is certified that error appears in the above-identified patent and that said Letters Patent is hereby corrected as shown below:

COLUMN 5

Line 25, "more" should read --more of--;
Line 36, "H—,and" should read --H—, an--;
Line 51, "Ltd.), etc." should read --Ltd.).--;
Line 52, "Photosensitive" should read --Excellent photosensitive--;
Line 53, "excellent," should be deleted;
Line 54, "structures to some extent, in" should read --structures, to some extent desirable--;
Line 56, "solvent." should read --solvent can be attained.--;
Line 58, "against those matters" should read --in those respects--;
Line 64, "required" should read --is required--;
Line 65, "damages of" should read --damage to--; and
Line 66, "by" should read --imparted by--.

COLUMN 6

Line 5, "of" should read --of a--;
Line 15, "including" should be deleted;
Line 17, "as" should be deleted;
Line 22, "uniformalize" should read --uniformize--;
Line 24, "be of" should read --be--;
Line 27, "polystylene" should read --polystyrene--;
Line 55, "filters" should read --filter--; and
Line 67, "is" should read --are--.

UNITED STATES PATENT AND TRADEMARK OFFICE
CERTIFICATE OF CORRECTION

PATENT NO. : 5,734,456

DATED : March 31, 1998

INVENTOR(S) : HIDEAKI TAKAO ET AL.

It is certified that error appears in the above-identified patent and that said Letters Patent is hereby corrected as shown below:

COLUMN 7

Line 19, "in" should be deleted;
Line 20, "match with" should read --matching-- and "pixels" should read --pixel--;
Line 21, "resulted from" should read --formed by--;
Line 32, "in" should be deleted;
Line 33, "match with" should read --matching-- and "pixels" should read --pixel--;
Line 36, "portions" should read --portion--;
Line 37, "different two" should read --two different--; and
Line 55, "epoxidized—1,4-polybutadiene)." should read --epoxidized 1,4-polybutadiene).--.

COLUMN 8

Line 1, "36 No." should read --vol. 36--.
Line 3, "36 No." should read --vol. 36--;
Line 4, "16 No." should read --vol. 16--;
Line 15, "exhibiting" should read --to exhibit--; and
Line 53, "particles) [AEROSIL" should read --particles [AEROSIL--.

COLUMN 9

Line 33, "uniformalized" should read --uniformized--;
Line 37, "in" should read --so as to--;
Line 42, "=1:4)." should read -- =1:4)].--;
Line 45, "Ltd.," should read --Ltd.),--;
Line 54, "Hitach" should read --Hitachi--; and
Line 59, "poltimide" should read --polyimide--.

UNITED STATES PATENT AND TRADEMARK OFFICE
CERTIFICATE OF CORRECTION

PATENT NO. : 5,734,456
DATED     : March 31, 1998
INVENTOR(S) : HIDEAKI TAKAO ET AL.

It is certified that error appears in the above-identified patent and that said Letters Patent is hereby corrected as shown below:

COLUMN 10

Line 55, "their" should read --its--.

COLUMN 11

Line 28, "filters" should read --filter--.

COLUMN 12

Line 27, "filters" should read --filter--.

Signed and Sealed this

Twentieth Day of October, 1998

Attest:

BRUCE LEHMAN

Attesting Officer

Commissioner of Patents and Trademarks